Aug. 24, 1943.    W. A. HEYMAN    2,327,351
EXPANDED SOLID CORN SYRUP
Filed Aug. 3, 1940
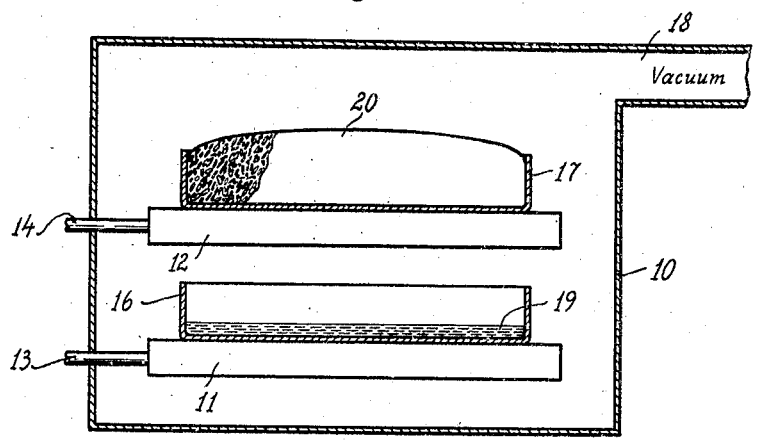
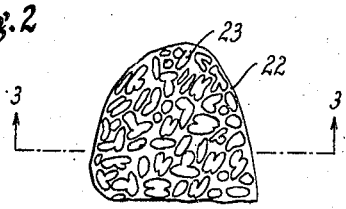
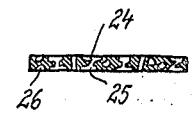
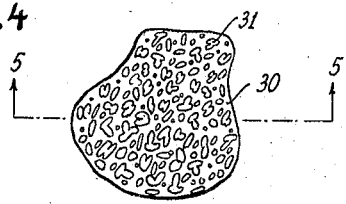
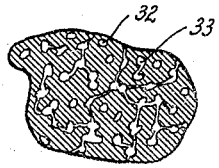
INVENTOR
Wilbert A. Heyman
BY Orville N. Greene
ATTORNEY Patented Aug. 24, 1943

2,327,351

UNITED STATES PATENT OFFICE 2,327,351

EXPANDED SOLID CORN SIRUP

Wilbert A. Heyman, New York, N. Y., assignor to Granular Foods, Inc., New York, N. Y., a corporation of Indiana Application August 3, 1940, Serial No. 351,265

8 Claims. (Cl. 127—34)

My invention relates to a novel process for the manufacture of solid relatively non-hygroscopic corn sirup and the products produced thereby. More specifically my invention relates to a method in which I subject liquid corn sirup to heat under a relatively high vacuum so that cells are formed from the water vapor developed within the corn sirup by heat, such cells being expanded by the action of heat on the contained water vapor and the vacuum externally applied so that an expanded cellular solid mass of dry corn sirup is obtained, which cellular structure upon cooling may be broken down or ground to the form of relatively small discrete particles, the characteristics of which are such that the dry corn sirup is in a readily available and stable form.

My invention is concerned with the production of two dry, solid corn sirup products of different and distinct characteristics, which will be more specifically described hereinafter.

The nature of liquid corn sirup is such that its widespread use in the industries has been retarded. Because of its thick viscous sirupy nature, it is cumbersome to handle and difficult to mix. Further, because of its appearance it has not been accepted as a substitute for sugar, although it possesses similar sweetening properties.

The desirability of producing a solid corn sirup has long been recognized, but the problems involved have never been hitherto satisfactorily solved. It has been suggested that corn sirup be sprayed in a heated atmosphere so that it dries in solid form.

There are various fundamental disadvantages to this product which may be outlined as follows. First, the corn sirup is formed into drop shape and is dried in that form. The heated atmosphere which effects the drying forms a thin skin on the outside of the drop which may be likened to a case hardening effect. Accordingly, the inside of the drop is not wholly dried since the case hardened skin prevents such drying and further the drop like form does not make the corn sirup particularly available for ready dissolution. Further, there is a loss by entrainment in the spray drying process, valuable material being carried off by the upwardly moving hot air currents. But most important of the defects in the solid corn sirup produced by spray drying is the moisture content and relative hygroscopicity. It is a fact that when corn sirup in the solid form has a moisture content of about five or six per cent, that it is capable of more rapidly taking up additional moisture than is dry corn sirup having a lower moisture content, say on the order of one percent. In other words, corn sirup containing five per cent moisture is much more receptive to the further taking up of moisture and will more quickly take up that moisture, than will corn sirup which contains for example one per cent of moisture. The property of hygroscopicity is extremely important particularly in the spray dried corn sirup because of the fact that the spray dried drop of corn sirup will, upon taking up moisture, lump together and form a coherent caked mass, which is obviously extremely undesirable from the standpoint of consumer acceptance, handling, appearance and solubility.

Dry corn sirup made by the spray drying process has a minimum of four per cent or more of moisture. The dry corn sirup made according to my invention may have moisture content of about one half per cent to two per cent.

Corn sirup is a well known commodity of commerce and is a thick viscous sirup which results from the acid hydrolysis of starch. It contains, dextrin, maltose and dextrose. The character of the corn sirup is determined by the degree of hydrolysis which is defined by the reducing sugars calculated as dextrose and expressed on a dry substance basis. The term "dextrose equivalent" has been adopted to indicate the contained reducing sugars calculated as dextrose. The relative percentage of dextrin, maltose and dextrose is dependent upon the dextrose equivalent, or "D. E." of the sirup.

Most important from the standpoint of the present invention is the amount of dextrin in the corn sirup. Corn sirup of a high D. E., such as 55, is relatively low in dextrin, while corn sirup of a medium D. E. such as 42, which is standard confectioner's sirup, has a relatively higher dextrin content.

Dextrin is an intermediary product of hydrolysis, which is in the form of a colloidal carbohydrate. Dextrose and maltose are sugars. Maltose differs from dextrin and dextrose inter alia by being hygroscopic. The dextrin component of corn sirup, when moist, or containing water possesses the property of elasticity. When dry its property of elasticity disappears, and the dextrin becomes rigid and brittle.

Maltose and dextrose are crystalloids; the dextrin as a colloid possesses another property, that of keeping the crystalloids from crystallizing, that is, it delays crystallization.

According to a process of my invention I pour liquid corn syrup into a suitable flat receptacle and apply heat thereto in the presence of a relatively high vacuum. The liquid corn sirup is boiled, the boiling point being reduced because of the vacuum and the boiling is continued under the vacuum while the liquid corn sirup grows more and more viscous. Bubbles of water vapor are entrapped in the viscous mass and because of the elasticity of the mass due to the dextrin and because of the negative pressure of the vacuum, the elastic bubble like mass expands into a porous spongy mass. While this is going on the mass is becoming more and more dehydrated, the dehydration being carried to a high point because of the large amount of surface exposed by the expansion of the mass to the porous spongy mass described.

As will be more particularly described hereinafter, the heating under vacuum is carried on until the mass is dehydrated down to a point where it contains approximately .5 to 2% of moisture. The dextrin, having lost its water content, is now a rigid brittle material and the mass accordingly sets and becomes hardened in its expanded porous cellular structure.

The final product obtained varies according to the D. E. of the initial corn sirup used. When, for example a 42 D. E. corn sirup is treated according to my process, then the resultant product is a porous spongy expanded cellular mass that is friable and easily crushed with the fingers. It is in the form of a flake like material of relatively low apparent density as on the order of 13 pounds per cubic foot. It contains expanded cells of a substantial size and has a water content on the order of .5 to 2%. The material being porous and in flake like form has new and unusual properties with regard to its utility. First, it has a relatively small amount of surface area as compared to the spray dried corn sirup which is in the form of tiny particles in the nature of a powder, and hence this new product has a tendency to take up less water because of the lower surface exposure. As has been pointed out this hygroscopicity is lowered to even a lower relative point because of the initial reduced moisture content. Secondly, my novel product readily is absorbed by and dissolved in water, even cold water, because of the porous spongy nature of the mass and because of the fact that the thin flake like form is quickly dissolved since water can penetrate readily therethrough.

When the final product of my invention is formed from a high D. E. corn sirup, such as 55 D. E. corn sirup, then because of the relatively lower content of dextrin, the elastic component, I obtain necessarily a cellular structure in which the cells are of relatively small size. The expanded cellular structure thus obtained by heating 55 D. E. corn sirup under a vacuum is a hard mass which must be ground in a grinding apparatus and thereupon is reduced to the form of small discrete particles which have the appearance generally similar to that of granulated sugar. This product has a high apparent density on the order of 55 pounds per cubic foot.

It is the object of my invention to provide a novel process for the production of a dry corn sirup.

It is a further object of my invention to provide a novel process for producing an expanded spongy dry corn sirup.

It is a further object of my invention to provide a novel process for dehydrating and expanding liquid corn sirup under heat sufficient to boil the corn sirup and under vacuum sufficient to expand the viscous cellular corn sirup which results from the boiling thereof.

It is a further object of my invention to produce a dry corn sirup product of relatively low hygroscopicity, having a friable cellular structure.

It is a further object of my invention to provide a novel dry corn sirup product in the form of generally flake like particles which is relatively soluble in aqueous fluids, but which has a low moisture content on the order of one half to two per cent.

It is a further object of my invention to provide a dry corn sirup product from 42 D. E. corn sirup, said final product being flaky in form and having an apparent density of about 13 pounds per cubic foot.

It is a further object of my invention to provide a dry corn sirup made from a corn sirup having a relatively high D. E., which product generally resembles granulated sugar in physical appearance.

It is a further object of my invention to provide a dry corn sirup product made from a corn sirup having a high D. E. on the order of 55, which dry corn sirup product has an apparent density of 55 pounds per cubic foot.

These and further objects of my invention will become apparent from a consideration of the drawing and description thereof which follows:

Figure 1 diagrammatically represents the apparatus employed in my invention.

Figure 2 is a plan view of the dry product of my invention formed from 42 D. E. corn sirup.

Figure 3 is a cross section taken along the line 3—3 of Figure 2.

Figure 4 is a plan view of the final dry product of my invention formed from 55 D. E. corn sirup.

Figure 5 is a cross section taken along the line 5—5 of Figure 4.

In Figure 1 I show a chamber 10 in which are located hollow shelves 11 and 12. By means of suitable feed pipes 13 and 14, hot or cold fluids, such as steam and cold water, can be fed to the hollow shelves 11 and 12 to suitably heat or cool the same. Positioned on the hollow shelves 11 and 12 are trays 16 and 17 adapted to hold the corn sirup during the processing thereof. Through a suitable feed pipe 18 reduction of pressure within the chamber 10 is effected by means of vacuum. A suitably sealed door, not shown here, may be employed to provide access to the chamber.

According to the process of my invention I take the 42 D. E. corn sirup 19 of 43 Bé. which is standard confectioner's sirup and pour that into the pan 16 so that the corn sirup fills the pan to a depth of approximately three-sixteenths of an inch. For example, in a pan having a drying surface of 756 square inches, I employ one-half gallon of liquid corn sirup. The pan 16 is then placed on the shelf 11 which is heated by means of steam applied thereto and vacuum is applied through the pipe 18. The temperature of the corn sirup during this process rises from 118° F. about 15 minutes after the process is begun, to about 176° F. when the process is complete. The vacuum applied at the beginning may vary, but I prefer to employ a high vacuum as the corn sirup begins to dry and solidify and this high vacuum should be on the order of an inch to an inch and a half of mercury at this point. An even higher vacuum is desirable if practical.

When the corn sirup is subjected to the heat and the vacuum it commences to boil and the water contained therein is driven off. As the corn sirup boils, the material becomes more and more viscous and dehydrated and the water vapor developed therein by the heat becomes entrapped in the form of a myriad of bubbles. These bubbles are expanded by the heat which expands the water vapor contained therein and the bubbles are also expanded by the lowered external pressure resulting from the vacuum.

When in this specification I refer to a vacuum of an inch or an inch and a half of mercury, I mean a vacuum that is an inch or an inch and a half from perfect vacuum. Mercurial measurement of this vacuum varies according to the atmospheric barometric pressure at the time.

The viscous corn sirup expands under the influence of these bubbles to a height of four inches or more. The exact expansion is controlled by the heat and vacuum employed. For extremely light fluffy, friable and porous material as high vacuum as possible is desirable. When a lower vacuum is employed, the cellular structure may be obtained but the mass is harder, more difficult to grind and heavier. As a result of the expansion and vacuum, the gas bubbles in the corn sirup finally break which permits the further dehydration of the internal structure since the heat and vacuum drive off the moisture vapor and moisture contained in the mass. I can obtain this expanded cellular structure according to my invention because of the elasticity and expandability of the dextrin component of the corn sirup which as I have pointed out has the characteristic of elasticity when containing water and rigidity when dehydrated. The point of demarkation between the rigid dextrin and the elastic dextrin may be placed at approximately two to two and one half per cent of moisture.

The final expanded product of my invention has a moisture content of about .5% to 2% and an apparent density of 13 pounds per cubic foot, and this final product may be obtained after about three to three and one half hours of heating.

After the corn sirup is dehydrated, dried and expanded to the form shown at 20 and described hereinabove, the steam is shut off and cold water is introduced through the pipe 14. I have shown diagrammatically the cellular structure of the expanded dry corn sirup. It is to be understood that this is only diagrammatic and that the actual cellular structure provides for a multiplicity of thin stretched walls of corn sirup such that when the cellular structure is broken down a multiplicity of flake like bodies results.

After the trays are thoroughly cooled, the vacuum is broken and the trays are removed from the chamber and the expanded cellular mass of dry corn sirup is removed from the pans. The product formed from 42 D. E. corn sirup is friable and fluffy and this material may be reduced to small flake like form shown in Figure 2 by relatively light pressure since a hand pressure alone could be employed to press the material through a screen mesh.

After the product 20 is screened through a suitable mesh, small flake like particles, such as 22 shown in Figure 2 are formed, characterized by openings 23, which are a result of the bubbles and channels from within the mass. In cross-section as shown in Figure 3, this material is flake like, having a relatively small thickness, and the bubbles 24 and 25 are interconnected, forming channels throughout the material. The bubble 26 is isolated.

The structure here shown has the two advantages previously generally referred to above. First, the flake like form presents a lesser surface exposure to the taking up of moisture than does a powder. Secondly, the flake like form with the channels and bubbles contained therein is readily dissolvable by a liquid since the relative distances to be attacked are small and when a solvent is applied to the flake, its action is almost immediate.

My process may also be carried out with a corn syrup having a high D. E., such as 55 D. E. in which corn sirup however there is a lower relative amount of dextrin. Since dextrin is the component which because of its elasticity assists in the formation of the expanded structure, the product formed from a 55 D. E. corn sirup is quite different from the product above described. The expansion is far less, but a definite expanded, porous cellular structure is still obtained. The final expanded structure obtained from three-sixteenths of an inch of corn sirup of 55 D. E. rises to a height of two or three inches in the pan and when cooled drops slightly, forming a hard glossy mass, which must be machine ground, in for example a micro mesh pulverizer, to reduce it to the desired form. When ground the material is in the form of small discrete particles, generally resembling granulated sugar in physical appearance. Inasmuch as it has the property of sweetening, but to a lesser degree than does granulated sugar, this appearance is a valuable commercial attribute since there is a prejudice in the trade against the use of a viscous liquid corn syrup as a sugar substitute both because of its appearance and because of the difficulty in handling the same.

In Figure 4 I show a plan view of the 55 D. E. dried corn sirup granule. The granule 30 has openings 31 which are the cells and channels contained therein opening into the surface. In the cross section of this granule, as shown in Figure 5, the contained cells 32 and connected contained cells 33 can be seen. The product obtained from 55 D. E. corn sirup is more hygroscopic than the product obtained from 42 D. E. corn sirup because of the lower dextrin content thereof. The high dextrin content of the 42 D. E. corn sirup tends to shield or envelop the more hygroscopic maltose and protect it from humid conditions.

Inasmuch as the boiling point of corn sirup having a 55 D. E. is higher than the boiling point of corn sirup having a 42 D. E., it is necessary in order to obtain the same relatively low moisture content of .5 to 2% as in the case of 42 D. E. corn sirup that the 55 D. E. corn sirup be heated at a higher temperature and/or for a longer period of time. If the same temperature, time and vacuum conditions are used in the treatment of both the 42 D. E. corn sirup and the 55 D. E. corn sirup, then the moisture content of the 55 D. E. corn sirup will be slightly higher, that is .3 to .5% higher, than the 42 D. E. corn sirup.

I have placed great emphasis herein on the moisture content of the dry corn syrup product and its physical shape. This is because these properties are of fundamental commercial importance. There is a rising curve of hygroscopicity for this material based upon the moisture content. Thus, the product of my invention having a moisture content of from one-half to two percent is much less hygroscopic than the spray dried corn sirup which has a moisture content of four or five percent. It is a physical characteristic of the material that the rate at which it takes up water varies according to the water content and this rate is lowest at the bottom of the scale. Expressed in a different way, it takes a much longer time for the solid corn sirup to take up water from say two to three percent than from five to six percent. This is a peculiar but important fact.

In the commercial usage of this product, it therefore follows that a solid corn sirup having a moisture content of one percent can be shipped, stored, and handled for an extended period of time, more in fact than is normally necessary, without any objectionable lumping or stickiness. A spray dried solid corn sirup having a moisture content of five percent, on the other hand, has often proved unsatisfactory because it takes up water much more rapidly causing difficulties in handling and usage, since the desirable free flowing characteristics are impaired.

The physical shape of the material is important from the standpoint of ready solubility, since the primary utility for solid corn syrup involves its dissolution in aqueous vehicles. The porous, fluffy, flake like form of my solid expanded corn syrup makes possible its quick dissolution.

Both the moisture content and the shape are important since my product formed as above set forth does not tend to cake but keeps in a free flowing condition for a much more extended period and dissolves more readily than dry corn sirup made by a spray dried process.

In order to offset the relatively high hydroscopicity of spray dried corn sirup which contains four percent of moisture, producers have employed corn sirup of lower D. E. e. g. 28–32. This low D. E. corn sirup tends to become hazy when dissolved in water.

A further feature of the fluffy particle form of my invention lies in the fact that it is irregular, and porous in shape and this physical condition is responsible for a quicker dispersion in an aqueous medium, such as milk or water in contradistinction to a powder like material which tends to cake or ball. My product readily is physically dispersed and scattered and quickly dissolved in said aqueous vehicles.

In the solid expanded mass which I form, I believe the dextrin molecules because of their relatively large size exert a physical blocking action to prevent the ready absorption of water by more hygroscopic maltose.

The expanded structure I obtain comprises an agglomerate of bubbles developed as pointed out hereinbefore. These bubbles for the large part are interconnecting affording a continuous passageway for penetration of fluids or gases throughout the material. There are, however, in certain cases isolated bubbles that are not interconnected.

The cooling of the expanded material after processing is primarily for handling, since the dehydration effects the setting of the expanded corn sirup. I have found that under the temperatures recited herein when the moisture content of the dextrin reaches about two and one-half per cent or less that the dextrin solidifies.

A further invention comprises the formation of a solid expanded cellular friable burnt corn sugar caramel coloring. To form this product, I take the caramel coloring of commerce formed by burning corn sugar in the presence of a suitable catalyst, such as ammonia. The liquid caramel color so formed, I deposit in a pan to form a thin layer, as for example, on the order of $\frac{3}{16}$ of an inch. I place this liquid burnt sugar caramel color in a chamber and apply a relatively high vacuum and then apply heat to boil and dehydrate the caramel coloring. The application of heat dehydrates the caramel coloring and renders it more viscous. As the caramel coloring becomes more viscous, the bubbles developed therein become entrapped in the viscous mass and the applied heat acts to expand these bubbles, the expansion being accelerated by the reduced pressure of the vacuum. The expansion of bubbles expands the mass and the application of heat and vacuum is continued until the bubbles expand and burst into one another. The mass is then set whereupon it is solid and in dehydrated form. The expanded solid caramel structure is friable and may be crushed by suitable grinding means to form particles of any desired size. The particles of expanded solid cellular burnt corn sugar caramel coloring have a granular structure. They have the advantage in commerce that they are more easily weighed, packaged, shipped and handled than the liquid form; this product also mixes more readily than the heavy viscous liquid caramel coloring, being soluble in cold fluids, the use of heat being unnecessary in this solution.

I claim:

1. In the process of converting liquid corn sirup containing a substantial amount of dextrin and water to a dehydrated solid expanded corn sirup product, the steps of heating liquid corn sirup in the presence of a vacuum at least as high as 1½ inches of absolute to cause said liquid corn sirup to boil, a part of the water contained in said liquid corn sirup being thus driven off as water vapor in the form of bubbles; continuing the heat and vacuum until sufficient water has been driven off so that the corn sirup becomes a stiff mass of such viscosity that the water vapor bubbles are entrapped therein; causing the entrapped water vapor bubbles to expand under the influence of the heat and vacuum applied thereto so as to expand the corn sirup, the expanding bubbles breaking into one another and breaking open at the surface of the mass to form intercommunicating cells in the interior of the relatively stiff corn sirup which cells communicate with the exterior of the mass by such surface breaking; applying further heat and vacuum so as to dehydrate the dextrin of the corn sirup and cause it to become substantially rigid and to drive out the moisture from the exposed interior of the corn sirup and thus set said corn sirup in the form of a solid dehydrated expanded mass having intercommunicating cells.

2. In the process of converting liquid corn sirup containing a substantial amount of dextrin and water to a dehydrated solid expanded corn sirup product, the steps of heating liquid corn sirup in the presence of a vacuum at least as high as 1½ inches of absolute to cause said liquid corn sirup to boil, a part of the water contained in said liquid corn sirup being thus driven off as water vapor in the form of bubbles; continuing the heat and vacuum until sufficient water has been driven off so that the corn sirup becomes a stiff mass of such viscosity that the water vapor bubbles are entrapped therein; causing the entrapped water vapor bubbles to expand under the influence of the heat and vacuum applied thereto so as to expand the corn sirup, the expanding bubbles breaking into one another and breaking open at the surface of the mass to form intercommunicating cells in the interior of the relatively stiff corn sirup which cells communicate with the exterior of the mass by such surface breaking; applying further heat and vacuum so as to dehydrate the dextrin of the corn sirup and cause it to become substantially rigid and to drive out the moisture from the exposed interior of the corn sirup and thus set said corn sirup in the form of a solid dehydrated expanded mass having intercommunicating cells; and breaking down said expanded corn sirup to particle size.

3. In the process of converting liquid corn sirup containing a substantial amount of dextrin and water to a dehydrated solid expanded corn sirup product the steps of pouring liquid corn sirup into a container to form a relatively thin layer of said corn sirup in said container, heating said thin layer of corn sirup in the presence of a vacuum at least as high as 1½ inches of absolute to cause said liquid corn sirup to boil, a part of the water contained in said liquid corn sirup being thus driven off as water vapor in the form of bubbles; continuing the heat and vacuum until sufficient water has been driven off so that the corn sirup becomes a stiff mass of such viscosity that the water vapor bubbles are entrapped therein; causing the entrapped water vapor bubbles to expand under the influence of the heat and vacuum applied thereto so as to expand the corn sirup, the expanding bubbles breaking into one another and breaking open at the surface of the mass to form intercommunicating cells in the interior of the relatively stiff corn sirup which cells communicate with the exterior of the mass by such surface breaking; applying further heat and vacuum so as to dehydrate the dextrine of the corn sirup and cause it to become substantially rigid and to drive out the moisture of the corn sirup through the exposed inner surfaces of the cell walls and thus set said corn sirup in the form of a solid dehydrated expanded mass having intercommunicating cells.

4. In the process of converting liquid corn sirup containing a substantial amount of dextrin and water to a dehydrated solid expanded corn sirup product the steps of heating liquid corn sirup in the presence of a vacuum at least as high as 1½ inches of absolute to cause said liquid corn sirup to boil, a part of the water contained in said liquid corn sirup being thus driven off as water vapor in the form of bubbles; continuing the heat and vacuum until sufficient water has been driven off so that the corn sirup becomes a stiff mass of such viscosity that the water vapor bubbles are entrapped therein; causing the entrapped water vapor bubbles to expand under the influence of the heat and vacuum applied thereto so as to expand the corn sirup, the expanding bubbles breaking into one another and breaking open at the surface of the mass to form intercommunicating cells in the interior of the relatively stiff corn sirup which cells communicate with the exterior of the mass by such surface breaking; applying further heat and vacuum so as to dehydrate the dextrin of the corn sirup and cause it to become substantially rigid and to drive out the moisture of the corn sirup through the exposed inner surfaces of the cell walls and thus set said corn sirup in the form of a solid dehydrated expanded mass having a moisture content of from .5 to 2% by weight and having intercommunicating cells.

5. In the process of converting liquid corn sirup containing a substantial amount of dextrin and water to a dehydrated solid expanded corn sirup product, the steps of heating liquid corn sirup having a 42 D. E. in the presence of a vacuum at least as high as 1½ inches of absolute to cause said liquid corn sirup to boil, a part of the water contained in said liquid corn sirup being thus driven off as water vapor in the form of bubbles; continuing the heat and vacuum until sufficient water has been driven off so that the corn sirup becomes a stiff mass of such viscosity that the water vapor bubbles are entrapped therein; causing the entrapped water vapor bubbles to expand under the influence of heat and vacuum applied thereto so as to expand the corn sirup, the expanding bubbles breaking into one another and breaking open at the surface of the mass to form intercommunicating cells in the interior of the relatively stiff corn sirup which cells communicate with the exterior of the mass by such surface breaking; applying further heat and vacuum so as to dehydrate the dextrin of the corn sirup and cause it to become substantially rigid and to drive out the moisture of the corn sirup through the exposed inner surfaces of the cell walls and thus set said corn sirup in the form of a solid dehydrated expanded mass having intercommunicating cells.

6. In the process of converting liquid corn sirup containing a substantial amount of dextrin and water to a dehydrated solid expanded corn sirup product the steps of heating liquid corn sirup having a 55 D. E. in the presence of a vacuum at least as high as 1½ inches of absolute to cause said liquid corn sirup to boil, a part of the water contained in said liquid corn sirup being thus driven off as water vapor in the form of bubbles; continuing the heat and vacuum until sufficient water has been driven off so that the corn sirup becomes stiff mass of such viscosity that the water vapor bubbles are entrapped therein; causing the entrapped water vapor bubbles to expand under the influence of heat and vacuum applied thereto so as to expand the corn sirup, the expanding bubbles breaking into one another and breaking open at the surface of the mass to form intercommunicating cells in the interior of the relatively stiff corn sirup which cells communicate with the exterior of the mass by such surface breaking; applying further heat and vacuum so as to dehydrate the dextrin of the corn sirup and cause it to become substantially rigid and to drive out the moisture of the corn sirup through the exposed inner surfaces of the cell walls and thus set said corn sirup in the form of a solid dehydrated expanded mass having intercommunicating cells.

7. A solid dehydrated expanded cellular corn sirup, the cells of which are formed and caused to break into communication with one another by heating liquid corn sirup and expanding said heated liquid corn sirup under a high vacuum, said corn sirup setting in solid dehydrated cellular form, said cells intercommunicating with one another.

8. A solid dehydrated expanded cellular corn sirup, the cells of which are formed and caused to break into communication with one another by heating liquid corn sirup of about 42 D. E. and expanding said heated liquid corn sirup under a high vacuum, said corn sirup setting in solid dehydrated cellular form, said cells intercommunicating with one another.

WILBERT A. HEYMAN.